US 12,516,726 B2

(12) United States Patent
Bauer et al.

(10) Patent No.: US 12,516,726 B2
(45) Date of Patent: Jan. 6, 2026

(54) HYDRAULIC SYSTEM WITH A HIGH SUMP AND A DRY SUMP

(71) Applicant: Schaeffler Technologies AG & Co. KG, Herzogenaurach (DE)

(72) Inventors: Tobias Bauer, Achern (DE); Ludwig Eisenbeis, Karlsruhe (DE); Carsten Mayer, Lohr a. Main (DE); Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/728,145

(22) PCT Filed: Dec. 9, 2022

(86) PCT No.: PCT/DE2022/100926
§ 371 (c)(1),
(2) Date: Jul. 11, 2024

(87) PCT Pub. No.: WO2023/134811
PCT Pub. Date: Jul. 20, 2023

(65) Prior Publication Data
US 2025/0102057 A1    Mar. 27, 2025

(30) Foreign Application Priority Data
Jan. 12, 2022   (DE) .......................... 102022100573.9

(51) Int. Cl.
*F16H 57/04*   (2010.01)
*F01M 1/12*   (2006.01)

(52) U.S. Cl.
CPC .......... *F16H 57/0441* (2013.01); *F01M 1/12* (2013.01); *F16H 57/0435* (2013.01);
(Continued)

(58) Field of Classification Search
CPC ............. F16H 57/0441; F16H 57/0435; F16H 57/045; F16H 57/0476; F01M 1/12; F01M 2001/123; F01M 2001/126
See application file for complete search history.

(56) References Cited

U.S. PATENT DOCUMENTS

| 3,800,913 A * | 4/1974 | Schmitt .................... F01M 1/12 |
| | | 74/606 R |
| 12,215,778 B2 * | 2/2025 | Greiter ................ F16H 57/0476 |

(Continued)

FOREIGN PATENT DOCUMENTS

| DE | 3422043 A1 | 12/1985 |
| DE | 102010018192 A1 | 12/2010 |

(Continued)

OTHER PUBLICATIONS

European Patent Office, International Search Report received in International Application No. PCT/ DE22/100926, Mar. 1, 2023, 22 pages (including translation).

(Continued)

*Primary Examiner* — Minh Truong
(74) *Attorney, Agent, or Firm* — Suiter Swantz IP

(57) ABSTRACT

The hydraulic system (1) presented here advantageously makes it possible for the sump to be designed merely in the form of a dry sump (5) which does not contain a separate pump module with a dedicated drive motor for delivering the hydraulic medium. Rather, hydraulic medium is delivered from the dry sump (5) via the dry sump pump flow (7) into a high sump (3), which is located above the dry sump (5). It is thus possible for the dry sump (5) to be made much smaller than a conventional gearbox sump or an oil pan. At the same time, it is possible to avoid the situation where the presence of a pump module in the gearbox sump means that, rather than the level of hydraulic medium being able to be kept beneath all the rotating components, components rotate (Continued)

in the hydraulic medium. In comparison with known systems, the design of the hydraulic system (1) proposed here therefore avoids churning losses. At the same time, having a common drive shaft (11) enables the drive of the pump flows (7, 9) to allow the corresponding pump module (6) to be easily controlled and to be of a simple construction.

18 Claims, 1 Drawing Sheet

(52) U.S. Cl.
CPC ..... *F16H 57/045* (2013.01); *F01M 2001/123* (2013.01); *F01M 2001/126* (2013.01); *F16H 57/0476* (2013.01)

(56) References Cited

U.S. PATENT DOCUMENTS

| | | | |
|---|---|---|---|
| 2013/0074628 A1* | 3/2013 | Uusitalo | F16H 57/0435 74/467 |
| 2019/0120369 A1* | 4/2019 | Staake | F16H 57/045 |
| 2023/0184321 A1* | 6/2023 | Nakamura | F16H 57/0476 184/6.22 |
| 2023/0341044 A1* | 10/2023 | Greiter | F16H 57/045 |
| 2024/0271692 A1* | 8/2024 | Gassmann | F16H 57/0436 |

FOREIGN PATENT DOCUMENTS

| | | |
|---|---|---|
| DE | 102015012345 A1 | 3/2017 |
| DE | 102016211226 B3 | 6/2017 |
| DE | 102017115070 A1 | 1/2019 |
| DE | 102019126914 A1 | 4/2021 |
| DE | 102019128957 A1 | 4/2021 |

OTHER PUBLICATIONS

German Patent Office, Office Action received in German Application No. 102022100573.9, Aug. 12, 2022, 8 pages (including translation).

European Patent Office, European Office Action received in EP Application No. 22829677.8, Aug. 21, 2025, 4 pages (including translation).

* cited by examiner

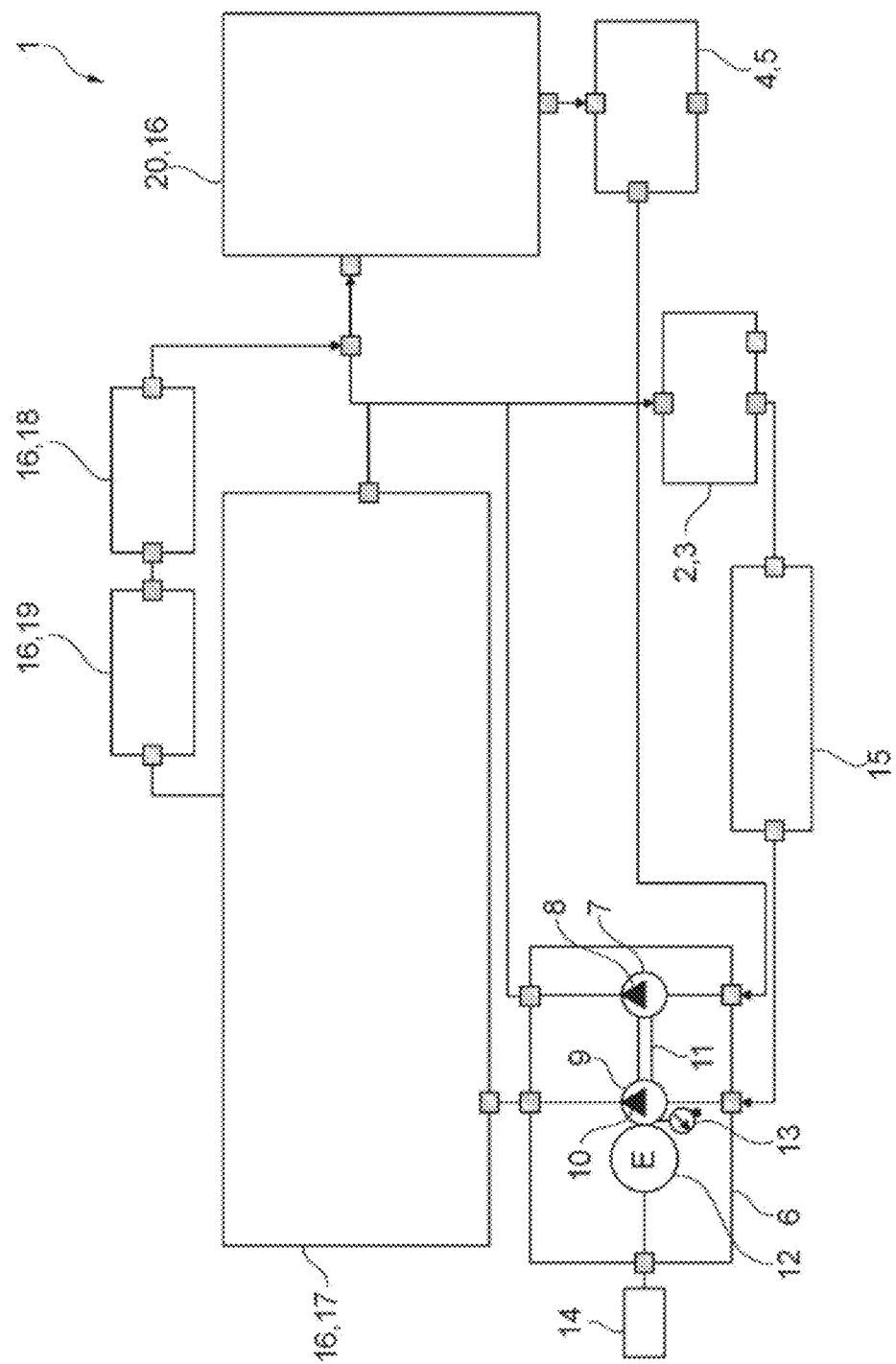

HYDRAULIC SYSTEM WITH A HIGH SUMP AND A DRY SUMP

CROSS-REFERENCE TO RELATED APPLICATION

The present application is the U.S. National Phase of PCT Patent Application Number PCT/DE2022/100926, filed on Dec. 9, 2022, which claims priority to German Patent Application Number 10 2022 100 573.9 of, filed Jan. 12, 2022, the entire disclosures of which are incorporated by reference herein.

TECHNICAL FIELD

The present disclosure relates to a hydraulic system for use in a motor vehicle, which comprises a high sump and a dry sump. The hydraulic system is preferably used in partially or fully electric drive trains of motor vehicles.

BACKGROUND

Hydraulic systems are known in which a hydraulic pump is provided in a transmission sump or an oil pan in the vehicle and conveys hydraulic medium from the transmission sump. In particular in modern drive trains of motor vehicles, the installation space available for such a transmission sump is becoming smaller and smaller, in particular as the accumulators or batteries required to operate electric machines are often installed in the floor area of the vehicle.

To counter this situation, a lower dry sump and a higher high sump are provided instead of a transmission sump or oil pan. Two pumps are required for operation here, wherein a first pump conveys the hydraulic medium from the dry sump to the high sump and a second pump conveys the hydraulic medium from the high sump to the hydraulic medium receivers. Hydraulic systems with two pumps are generally known, for example from DE 10 2017 115 070 A1. The solution disclosed therein has two pumps that operate at different pressure levels and are controlled separately from one another. Depending on the design, this type of control can be complex.

Proceeding therefrom, the object of the present disclosure is to at least partially overcome the problems known from the prior art.

SUMMARY

This object is achieved with by features of the independent claim 1. Further advantageous embodiments of the disclosure are specified in the dependent claims. The features listed individually in the dependent claims can be combined with one another in a technologically meaningful manner and can define further embodiments of the disclosure. In addition, the features indicated in the claims are specified and explained in more detail in the description, wherein further preferred embodiments of the disclosure are shown.

The hydraulic system according to the disclosure for a motor vehicle, in particular an electrically drivable motor vehicle, comprises a high sump as a first reservoir for hydraulic medium and a dry sump as a second reservoir for hydraulic medium; a dry sump pump flow which has a first conveying direction and which is connected on the input side to the dry sump and on the output side to the high sump with respect to the first conveying direction, a main pump flow which has a second conveying direction and which is connected on the input side to the high sump and on the output side to at least one hydraulic medium receiver with respect to the second conveying direction, and is characterized in that an electric motor is provided, which is connected to the dry sump pump flow and the main pump flow via a common drive shaft.

An electrically drivable motor vehicle is understood to be a motor vehicle which has at least one electric machine for providing torque for driving the motor vehicle. In addition, an internal combustion engine and/or at least one further electric machine can be provided. A hydraulic medium is understood to be a fluid that is used to transfer energy through a volume flow and/or pressure in hydraulic systems. Preferably, hydraulic oils are used as hydraulic media.

The hydraulic medium is used to actuate actuators or cylinders on the one hand and the hydraulic medium is used for lubrication and, if necessary, cooling on the other.

When installed in the motor vehicle, the high sump is located above the dry sump with respect to the action of the gravitational force. The dry sump pump flow empties the dry sump and ensures that the high sump is filled at the same time. The main pump flow conveys the hydraulic medium from the high sump to the hydraulic medium receivers for hydraulic actuation, lubrication and/or cooling. Instead of two pumps, the present hydraulic system has one pump module with two pump flows, which are driven by a single electric motor via a common drive shaft. The dry sump pump flow and the main pump flow are therefore operated in a speed-synchronous manner. The speed-synchronous operation simplifies the control of the pump flows.

Preferably, the hydraulic system comprises a pump control for controlling the speed of the electric motor. This is preferably connected to a speed sensor, which is used to measure the speed of the common drive shaft.

Preferably, the pump control controls the speed of the electric motor and thus of the common drive shaft depending on the demand of the at least one hydraulic medium receiver for hydraulic medium. Preferably, the dry sump pump flow and the main pump flow are designed such in this regard that the dry sump is always emptied and the high sump is filled accordingly for all possible hydraulic medium demands in the hydraulic system. This allows for a simple control of the pump flows.

Preferably, the electric motor is designed as a direct current motor, in particular as a brushless direct current motor. This enables simple control, while at the same time reducing wear on the electric motor.

Preferably, the at least one hydraulic medium receiver comprises at least one of the following receivers:
a) a valve unit for actuating at least one valve;
b) a heat exchanger;
c) at least one electric machine for providing torque for driving the motor vehicle; and
d) a transmission.

The valve unit can be used to achieve a hydraulic interconnection in the hydraulic system. This means that complex hydraulic circuits, for example, which are used to engage and disengage different gears in a dual-clutch transmission and also actuate a parking lock, can be realized in a compact component. A heat exchanger can be used to transfer heat between the hydraulic medium and a heat medium such as air or water, so that the hydraulic medium can be temperature-controlled and, in particular, cooled. The electric machine is used to provide torque in the drive train of the motor vehicle for driving the motor vehicle. In this regard, only electric machines can provide torque and thus enable a fully electric drive train, or torque can also be provided, at least temporarily, by an internal combustion engine, resulting in a hybrid drive train. In the case of the electric machine, the hydraulic medium is used for lubrication and cooling. The transmission preferably provides multiple ratios, in particular in the form of different gears. The transmission is preferably a dual-clutch transmission, which has two partial transmissions, for example with different gears, and correspondingly two clutches, via each of which a partial transmission can be connected to the drive.

An embodiment is preferred in which the main pump flow is connected on the output side to a valve unit and downstream of the valve unit to an electric machine for providing torque to the motor vehicle. This means that the hydraulic medium can be used to actuate actuators in the valve unit on the one hand and to lubricate and cool the electric machine on the other. This allows for a simple structure of the hydraulic system.

Furthermore, it is preferred that a heat exchanger is provided between the valve unit and the electric machine. In this way, further cooling of the hydraulic medium before it flows into the electric machine can be achieved.

Preferably, the main pump flow and the dry sump pump flow are designed such that, both at the highest hydraulic medium demand to be assumed and at the lowest hydraulic medium demand to be assumed for the hydraulic medium receivers and the respective associated speeds of the main pump flow, both emptying of the dry sump and a corresponding supply of hydraulic medium to the hydraulic medium receivers are ensured. The maximum possible and minimum possible hydraulic medium demands of the hydraulic medium receivers are known from the design of the hydraulic system. From this, a speed range of the electric motor and a design of the main pump flow can then be derived. At the same time, it is then possible to design the dry sump pump flow based on that, as this also determines the demand for hydraulic medium with respect to the emptying of the dry sump and the provision to the high sump.

As a precaution, it should be noted that the numerical designations used here ("first", "second", etc.) serve primarily (only) to distinguish between several similar objects, sizes, or processes, and in particular no necessary dependency and/or sequence of these objects, sizes, or processes to each other is indicated. If a dependency and/or sequence is necessary, this is explicitly stated here or results in a manner obvious to the person skilled in the art when studying the specifically described embodiment.

Both the disclosure and the technical field are explained in more detail below with reference to the figures. It should be noted that the disclosure is not intended to be limited by the exemplary embodiment shown. In particular, unless explicitly stated otherwise, it is also possible to extract partial aspects of the subject matter outlined in the FIGURE and to combine them with other components and knowledge from the present description and/or FIGURE. In particular, it should be noted that the FIGURE and in particular the size relationships shown are only schematic in nature. In the drawings:

BRIEF DESCRIPTION OF THE DRAWINGS

FIG. 1: shows a schematic drawing of a hydraulic system.

DETAILED DESCRIPTION

FIG. 1 schematically shows an example of a hydraulic system 1 having a first reservoir 2, which is designed as a high sump 3, and a second reservoir 4, which is designed as a dry sump 5. Here, the dry sump 5 is located below the high sump 3 with respect to the action of the gravitational force.

Furthermore, the hydraulic system 1 comprises a pump module 6 having a dry sump pump flow 7 which has a first conveying direction 8. In addition, the pump module 6 comprises a main pump flow 9 having a second conveying direction 10. Both the dry sump pump flow 7 and the main pump flow 9 are connected to an electric motor 12 via a common drive shaft 11. The main pump flow 9 and the dry sump pump flow 7 are thus driven in a speed-synchronous manner by the electric motor 12. In this regard, the speed of the drive shaft 11 is measured via a speed sensor 13, which is connected to a pump control 1. The speed sensor 13 is optional here. Alternatively or in addition, it is preferred that the speed is determined indirectly, for example based on known variables such as the electrical current and the electrical voltage. In this regard, the pump control 14 controls the speed of the electric motor 12. The electric motor 12 is designed as a brushless direct current motor.

The dry sump pump flow 7 is connected on the input side, with respect to the first conveying direction 8, to the dry sump 5. The dry sump pump flow 7 is connected on the output side, with respect to the first conveying direction 8, to the high sump 3, so that during operation the dry sump pump flow 7 conveys hydraulic medium from the dry sump 5 into the high sump 3. In this way, the dry sump 5 is emptied and the high sump 3 is filled.

The main pump flow 9 is connected on the input side, with respect to the second conveying direction 10, to the high sump 3 via an intake filter 15. The main pump flow 9 is connected on the output side, with respect to the second conveying direction 10, to multiple hydraulic medium receivers 16. Here, the hydraulic medium receivers 16 use the hydraulic medium as a high-pressure medium to actuate hydraulic control elements and/or for cooling.

Directly downstream of the main pump flow 9, a valve unit 17 is provided as a hydraulic medium receiver 16. This valve unit 17 can be used, for example, to pressurize one or more actuators with hydraulic medium in order to trigger processes such as engaging or disengaging a gear in a transmission, actuating a clutch or actuating a parking lock. Downstream of the valve unit 17, a further hydraulic medium receiver 16 is designed as an electric machine 18, which provides torque in a drive train for driving the motor vehicle. Preferably, the drive train can also comprise an internal combustion engine, not shown, as an additional source of torque. In the electric machine 18, the hydraulic medium is used for lubrication and cooling. In order to support the cooling, a heat exchanger 19 is provided between the valve unit 17 and the electric machine 18, via which the hydraulic medium can be cooled before flowing into the electric machine 18. For this purpose, the hydraulic medium is in thermal contact with a heat medium, in particular air or water, in the heat exchanger 19.

Downstream of the electric machine 18, the hydraulic medium is supplied to a transmission 20 and the valve unit 17 for lubrication. With respect to the action of the gravitational force, the dry sump 5 is formed below the transmission 20.

In operation, the pump control 14 controls the speed of the common drive shaft 11 depending on the demand of the at least one hydraulic medium receiver 16 for hydraulic medium. This can vary significantly depending on the operating situation, as, for example, the cooling demand of the electric machine 18 varies depending on the speed of the electric machine 18 and the demand for hydraulic medium under high pressure in the valve unit 17 can vary depending on the switching state. In this regard, the main pump flow 9 and the dry sump pump flow 7 are designed such that, both at the highest hydraulic medium demand to be assumed and at the lowest hydraulic medium demand to be assumed and the respective associated speeds of the main pump flow 9, both emptying of the dry sump 5 and a corresponding supply of hydraulic medium to the hydraulic medium receivers 16 are ensured.

The hydraulic system 1 presented here advantageously makes it possible for the sump to be designed merely in the form of a dry sump 5 which does not contain a separate pump module with a dedicated drive motor for conveying the hydraulic medium. Rather, hydraulic medium is conveyed from the dry sump 5 via the dry sump pump flow 7 into a high sump 3, which is located above the dry sump 5. It is thus possible for the dry sump 5 to be made much smaller than a conventional transmission sump or an oil pan. At the same time, it is possible to avoid the situation where the presence of a pump module in the transmission sump means that, rather than the level of hydraulic medium being able to be kept beneath all the rotating components, components rotate in the hydraulic medium. In comparison with known systems, the design of the hydraulic system 1 proposed here therefore avoids churning losses. At the same time, the driving of the pump flows 7, 9 by means of a common drive shaft 11 allows for the corresponding pump module 6 to be easily controlled and to be of a simple construction.

LIST OF REFERENCE SYMBOLS

1 Hydraulic system
2 First reservoir
3 High sump
4 Second reservoir
5 Dry sump
6 Pump module
7 Dry sump pump flow
8 First conveying direction
9 Main pump flow
10 Second conveying direction
11 Drive shaft
12 Electric motor
13 Speed sensor
14 Pump control
15 Intake filter
16 Hydraulic medium receiver
17 Valve unit
18 Electric machine
19 Heat exchanger
20 Transmission

The invention claimed is:

1. A hydraulic system for an electrically-drivable motor vehicle comprising:
   a high sump as a first reservoir for hydraulic medium and a dry sump as a second reservoir for hydraulic medium;
   a dry sump pump flow which has a first conveying direction and which is connected on an input side to the dry sump and on an output side to the high sump with respect to the first conveying direction;
   a main pump flow which has a second conveying direction and which is connected on an input side to the high sump and on an output side to at least one hydraulic medium receiver with respect to the second conveying direction; and
   wherein an electric motor is provided, which is connected to the dry sump pump flow and the main pump flow via a common drive shaft; wherein the main pump flow is connected on the output side to a valve unit and downstream of the valve unit to an electric machine for providing torque to the motor vehicle; wherein downstream of the electric machine, the hydraulic medium is supplied to a transmission and the valve unit for lubrication.

2. The hydraulic system according to claim 1, further comprising a pump control for controlling a speed of the electric motor.

3. The hydraulic system according to claim 2, wherein the pump control controls the speed of the electric motor depending on a demand of the at least one hydraulic medium receiver for hydraulic medium.

4. The hydraulic system according to claim 1, wherein the electric motor is designed as a direct current motor.

5. The hydraulic system according to claim 4, wherein the direct current motor is designed as a brushless direct current motor.

6. The hydraulic system according to claim 1, wherein the at least one hydraulic medium receiver comprises at least one of:
   the valve unit for actuating at least one valve;
   a heat exchanger;
   at least one electric machine for providing torque for driving the motor vehicle; or
   a transmission.

7. The hydraulic system according to claim 1, wherein a heat exchanger is provided between the valve unit and the electric machine.

8. The hydraulic system according to claim 1, wherein the valve unit is configured to pressurize one or more actuators with the hydraulic medium to engage or disengage a gear in the transmission.

9. A hydraulic system comprising
   a high sump, wherein the high sump is configured as a first reservoir for hydraulic medium;
   a dry sump, wherein the dry sump is configured as a second reservoir for hydraulic medium;
   a dry sump pump flow, wherein the dry sump pump flow has a first conveying direction, wherein an input side of the dry sump pump flow is connected to the dry sump and an output side of the dry sump pump flow is connected to the high sump;
   a main pump flow, wherein the main pump flow has a second conveying direction, wherein an input side of the main pump flow is connected to the high sump and an output side of the main pump flow is connected to at least one hydraulic medium receiver,
   wherein the dry sump pump flow and the main pump flow are connectable to an electric motor of an electrically drivable motor vehicle via a common drive shaft; wherein the main pump flow is connected on the output side to a valve unit and downstream of the valve unit to an electric machine for providing torque to the motor vehicle; wherein downstream of the electric machine, the hydraulic medium is supplied to a transmission and the valve unit for lubrication.

10. The hydraulic system according to claim 9, further comprising a pump control configured to control a speed of the electric motor.

11. The hydraulic system according to claim 10, wherein the pump control is configured to control the speed of the electric motor based on a demand of the at least one hydraulic medium receiver for the hydraulic medium.

12. The hydraulic system according to claim 9, wherein the electric motor comprises a direct current electric motor.

13. The hydraulic system according to claim 9, wherein the at least one hydraulic medium receiver comprises at least one of: the valve unit for actuating at least one valve; a heat exchanger; at least one electric machine for providing torque for driving the motor vehicle; or a transmission.

14. The hydraulic system according to claim 9, further comprising a heat exchanger located between the valve unit and the electric machine.

15. An electrically-drivable motor vehicle comprising:
an electric motor;
a drive shaft; and
a hydraulic system comprising:
   a high sump;
   a dry sump;
   a dry sump pump flow configured to transfer hydraulic medium in a first conveying direction, wherein an input side of the dry sump pump flow is connected to the dry sump and an output side of the dry sump pump flow is connected to the high sump;
   a main pump flow configured to transfer hydraulic medium in a second conveying direction, wherein an input side of the main pump flow is connected to the high sump and an output side of the main pump flow is connected to at least one hydraulic medium receiver; and
   wherein the dry sump pump flow and the main pump flow are connected to the electric motor via the drive shaft; wherein the main pump flow is connected on the output side to a valve unit and downstream of the valve unit to an electric machine for providing torque to the motor vehicle; wherein downstream of the electric machine, the hydraulic medium is supplied to a transmission and the valve unit for lubrication.

16. The electrically-drivable motor vehicle according to claim 15, further comprising a pump control configured to control a speed of the electric motor.

17. The electrically-drivable motor vehicle according to claim 15, wherein the electric motor comprises a direct current electric motor.

18. The electrically-drivable motor vehicle according to claim 17, wherein the direct current motor comprises a brushless direct current motor.

* * * * *